(12) United States Patent
Atchison et al.

(10) Patent No.: US 6,570,706 B2
(45) Date of Patent: May 27, 2003

(54) LOW ENERGY SOURCE FRONT PROJECTION SCREEN FOR LARGE SCREEN PICTORIAL DISPLAYS

(76) Inventors: Nickey J. Atchison, 215 Woodrow Ave., Santa Cruz, CA (US) 95060; Brad Ferrell, P.O. Box 6, Moore, SC (US) 29369

(*) Notice: Subject to any disclaimer, the term of this patent is extended or adjusted under 35 U.S.C. 154(b) by 0 days.

(21) Appl. No.: 09/896,292

(22) Filed: Jul. 2, 2001

(65) Prior Publication Data

US 2003/0002152 A1 Jan. 2, 2003

(51) Int. Cl.[7] .................. G03B 21/56; G03B 21/60; G02B 27/10
(52) U.S. Cl. .................. 359/449; 359/455; 359/459; 359/627; 359/628
(58) Field of Search .................. 359/449, 443, 359/455, 459, 619, 628, 627

(56) References Cited

U.S. PATENT DOCUMENTS

| | | | | |
|---|---|---|---|---|
| 5,337,186 A | * | 8/1994 | Oikawa et al. | 359/628 |
| 5,456,967 A | * | 10/1995 | Nezu | 428/141 |
| 5,592,332 A | * | 1/1997 | Nishio et al. | 359/619 |

* cited by examiner

*Primary Examiner*—Russell Adams
*Assistant Examiner*—Magda Cruz

(57) ABSTRACT

A two element low energy source front projection screen for pictorially displaying upon a front face of the screen an image projected onto the front face from a projector comprised of a metallic support sheet having a front reflective surface and a sheet of lenticular lenses which overlays the front reflective surface of the support sheet. The lenticular lenses provide a focal point of reflective light on their surface in a narrow bright serpentine line separated from each other by dark regions. This optical arrangement is perceived by the eye as the brightness of the bright lines rather than the average brightness of the whole region.

10 Claims, 6 Drawing Sheets

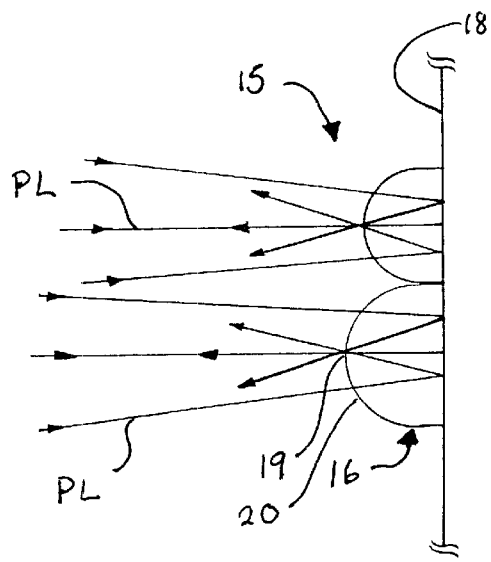
Fig. 10
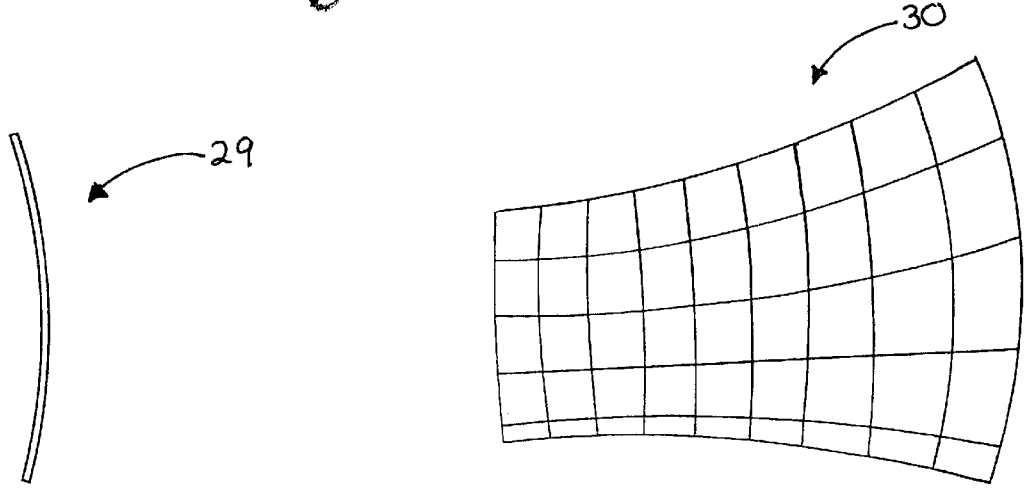
Fig. 11
Fig. 12

LOW ENERGY SOURCE FRONT PROJECTION SCREEN FOR LARGE SCREEN PICTORIAL DISPLAYS

BACKGROUND OF THE INVENTION

1. Technical Field

The present invention relates to pictorial display devices such as television devices and more particularly to a method and apparatus for improving image fidelity, color fidelity, contrast ratio and brightness of front projection screens.

2. Description of Prior Art

Projection type pictorial display devices generally are classified as rear or back projection screens and front projection screens. With back projection screens, an image is displayed upon the selectively darkened front face of the screen by projection onto the back face of the screen.

In front projection devices an image is projected directly onto the front face of a screen from the front face. Back projection systems are generally preferred if space is available behind the screen since the contrast ratio with high ambient light levels is higher. Front projection screens are used in other applications in which the projectors must be placed forward and spaced from the screen such as for example in systems used for projection screens that are greater than eight feet diagonal. There is, however, in any type of large screen projection system a primary concern dealing with how to reduce manufacturing and operational costs while improving the quality of the image produced.

An ideal front projection screen would have high enough gain and wide enough angle of view that the light sources of standard color televisions/monitor screens or flat panel LCD displays could be used for the image source. Flat panel LCD screens and standard CRT television/monitor tubes have few convergent problems associated with projection systems and have long life and do not require cooling fans or expensive illumination lamps. Such prior art high gain screens that could be used with such image sources have narrow viewing angles. The ideal front projection screen would therefore appear as a solid black surface in the presence of reflected light, but would still reflect all of the light that falls on the screen from a projector. It would be desirable to keep manufacturing costs down by having as few elements or layers in the screen as possible and integrate the functions of the screen backing reflective surface refracting elements and diffusing elements.

Heretofore, prior art front projection screens have utilized high-energy image sources that have inherent convergent problems or require cooling fans and expensive lamps. Multiple CRT systems have convergent problems that can only be more apparent as the projector magnification increases.

LCD projectors have very loud fans are distracting if not contained in special sound proof rooms, thus prior art high gain retro-reflective materials have not been used because of the inherent low angle of view restrictions as noted above.

Screen gain is defined in prior art by an initial standard formed of white marble with a buff finish as a gain of 1. Prior art aluminized screens have a gain of 2–3 and a field of view of greater than 40 degrees. Glass beaded screens have a gain of 3–4 and a field view greater than 40 degrees.

High gain screens such as speed limit signs have a gain of 10 to 11 in a field of less than 10 degrees. The method of this invention provides for a screen with a gain of 30 or greater and a field of view greater than 40 degrees. The high gain and wide field of view of the method of this invention makes it possible to use image sources of a much lower intensity produce large screen front projection televisions. Prior art examples directed towards use of lenticular lenses can be seen in U.S. Pat. No. 5,625,489 which describes a front projection screen having a sheet array of lenticular lenses with the thickness of the sheet being defined as the focal point of the lenses. Light from a projection source is then focused onto to small points at the focal point of the lens on the back of the screen. A fiber optic is positioned at the focal point of each lens at the rear of the screen and then is bent in a 180-degree arc and brought back into the screen through a small hole in the sheet array between adjacent lenses. The fiber then emits the reflective light over a large angle of roughly 90 degrees from the fiber.

The screen of the present invention accomplishes concentration and remission of light in the direction of the viewer by putting a reflector at approximately half the distance to the focal point of the lenticular lens so that the light focuses on the front surface of the lens where it is re-admitted. Practice has shown that air lenticular lens interface provides a sufficient diffusion site to provide a screen with a gain of greater than 20. Curving the screen of the invention improves the gain to above 30 without occurrence of dark regions at the corners of the screen are hot spots in the center of the screens.

Close inspection of the screen of the invention reveals that many small bright regions surrounded by dark rings so that the gain of the screen is roughly the area of the dark spots divided by the area of bright spots.

The screen of the invention provides a mosaic of bright spots surrounded by dark regions which at a distance is perceived by the human eye as a continuous image of greater brightness. The method of the invention illustrates the fact that the eye perceives the intensity of the bright spots as brightness of the screen rather than the average of the brightness of the whole screen. This relationship has shown an improvement in apparent resolution of the screen which is caused by the plurality of serpentine lenticular lenses of the invention having a dimension that is at least one-third of the dimension of the pixels projected on the screen which the eye perceives as increased density of pixels as an increased resolution.

SUMMARY OF THE INVENTION

A front projection screen that provides a high gain front pictorial display is formed as a simple two element composite structure having irregular spheres or hyperbolic refracting lens components which integrally double as focusing lens components and diffusion surfaces integrally formed within the two elements of the projection screen. The focusing lens components are situated along the front face of this projection screen approximate the image to be viewed and the radius of the curvature of the focusing lens components are so dimensioned relative to the thickness of the screen that the foci of the focusing lens components are located along the front face of the screen. Refracting lens components with irregular focal distances are formed at the screen surface closest to the viewer such that irregular bright regions of light are formed on the same surface of the screen.

DESCRIPTION OF THE DRAWINGS

FIG. 10 is a graphic illustration as of a sectioned view on lines 10—10 of FIG. 9;

FIG. 11 is a side view of a spherical section screen; and

FIG. 12 is a perspective view of a torus screen section.

DESCRIPTION OF THE PREFERRED EMBODIMENTS

Figure 1:
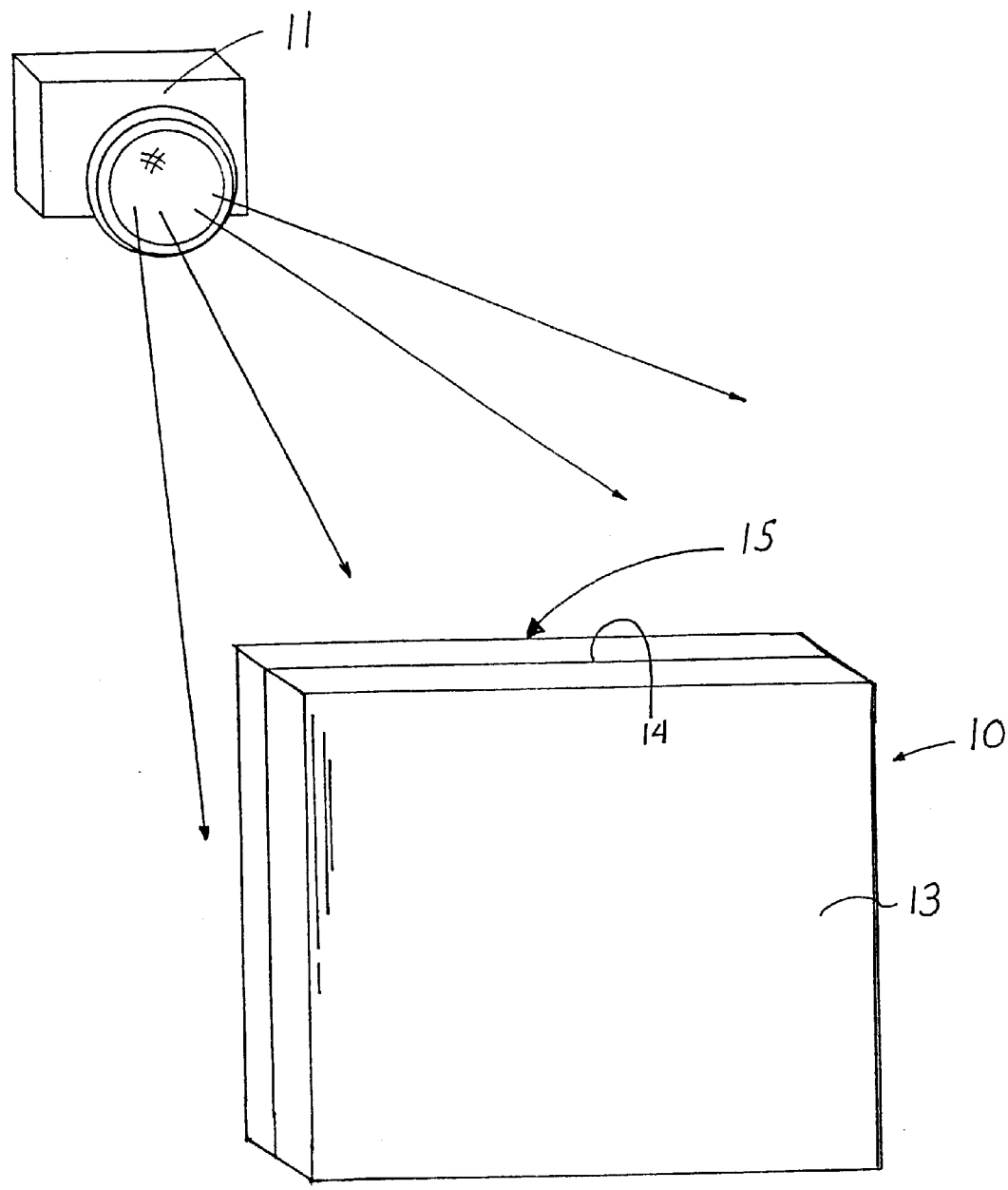
FIG. 1 is a perspective view of the front projection system of the invention.
Figure 2:
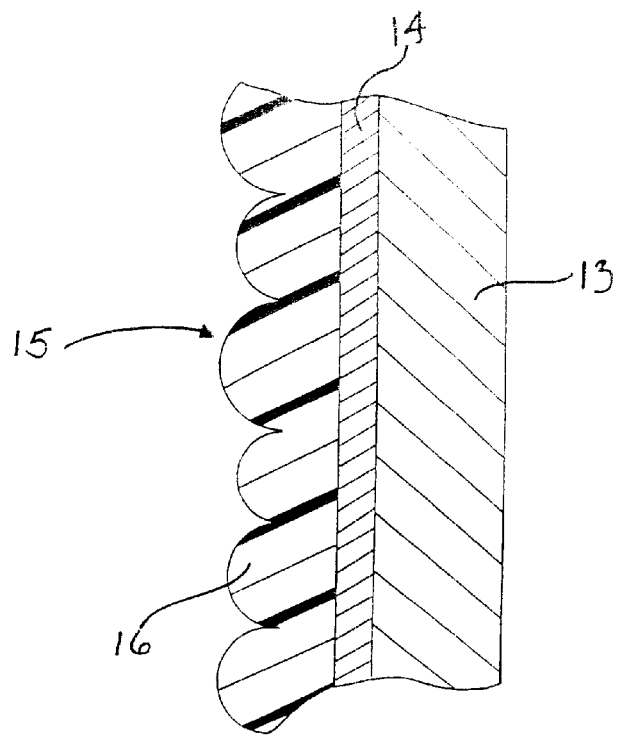
FIG. 2 is an enlarged sectional view of a portion of the front projection screen.

Referring now to FIGS. 1 and 2 of the drawings, a projection screen 10 of the invention can be seen for use with a video image source 11 having a projector lens 12 through which an image is projected. The projection screen 10 has a backing layer 13 with a highly reflective applied front surface 14. A sheet array 15 of lenticular lenses 16 overlays the reflective flat surface 14 of the backing layer 13.

Figure 3:
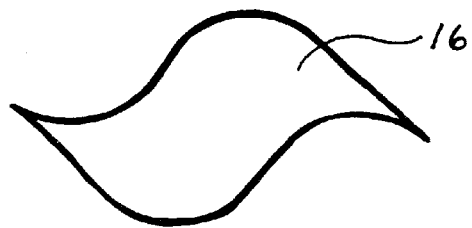
FIG. 3 is an enlarged front elevational view of a single lenticular lens used in the invention.
Figure 9:
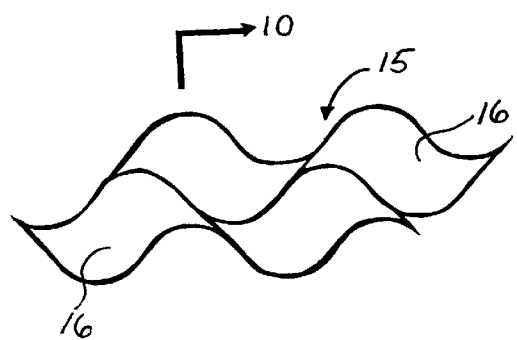
FIG. 9 is an enlarged graphic illustration of multiple serpentine lenticular lenses.

The lenticular lens array 15 is preferably made of a molded synthetic resin material in which each of the lens element 16 has a maximum width equal to one-third–one-sixth its length as best seen in FIGS. 3 and 9 of the drawings.

Figure 4:
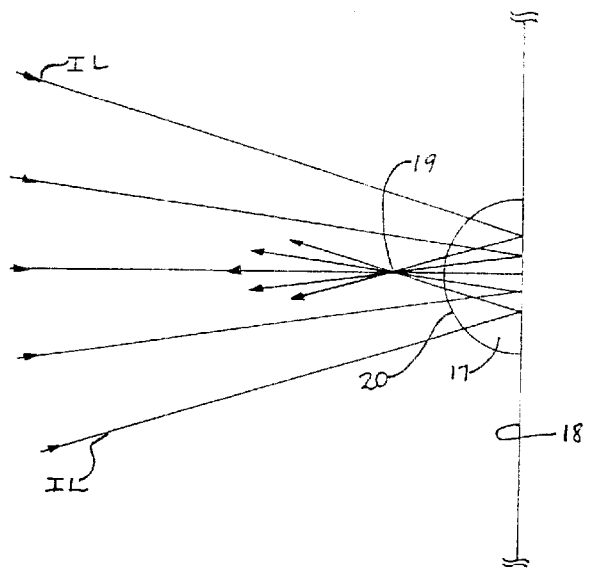
FIG. 4 is a graphic illustration of a half cylinder lens mounted on a reflective surface.

The properties of the lenticular lens 16 is derived from a prior art half cylindrical lens 17 shown in FIG. 4 of the drawings mounted on a highly reflective surface 18. Incoming light IL passes through the lens 17 and is reflected back through the lens defining a focal point at 19 in spaced relation to a front surface 20 of the lens 17.

Figure 5:
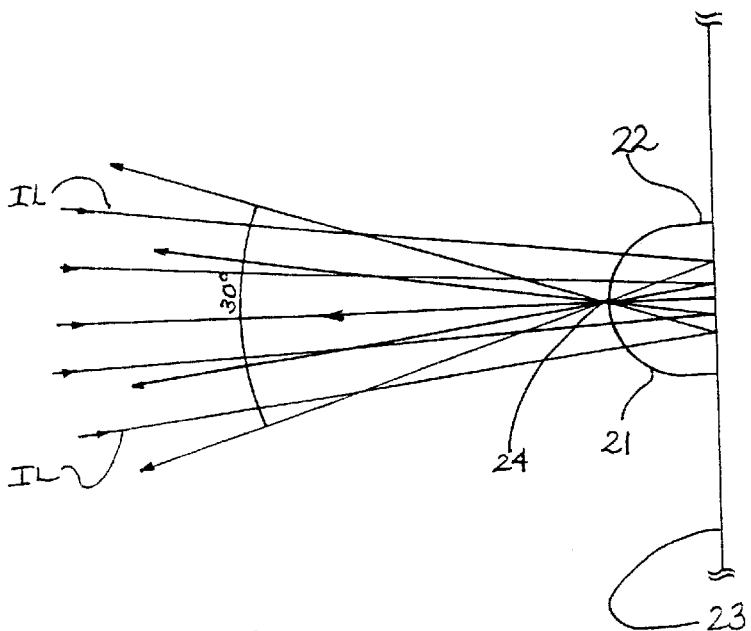
FIG. 5 is a graphic illustration of the reflective properties of a lenticular lens mounted on an elongated pedestal against a reflective surface.

Referring now to FIG. 5 of the drawings, a half cylinder lens 21 is mounted on an elongated pedestal 22 against a highly reflective surface 23. The incoming light IL focuses through the lens 21 and the pedestal 22 (emulating a lenticular lens) and is reflected back therethrough defining a focal point at the front surface 24 of the lens 21. The effective focal point is convergent with the front surface 20 of the lens 17 which is a diffused surface causing the reflective light (indicated by directional arrows 24A) to disperse at an optimum viewing angle of 30 degrees.

Figure 6:
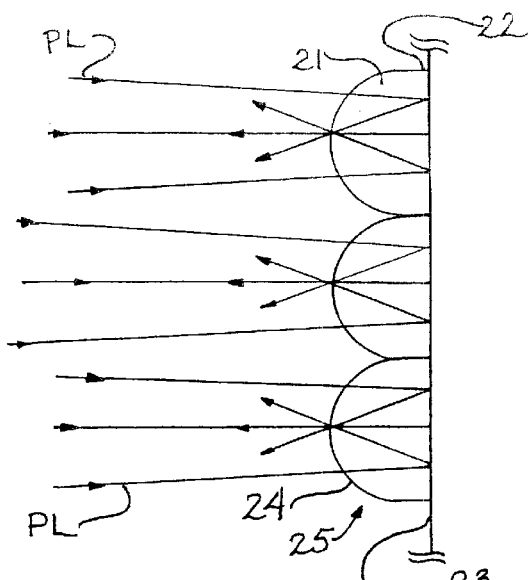
FIG. 6 is a graphic illustration of the reflective properties of multiple lenticular lenses mounted on an elongated pedestals on a reflective surface in an array configuration.

Referring to FIG. 6 of the drawings, a sheet array 25 is formed of a plurality of half circular lenses 21 that are mounted on respective pedestals 22 can be seen as acting as illustrative lenticular lenses in which the front surface 24 acts as the diffusion surface. Projection light PL directed onto the array 25 is refracted by the lens 21 then reflected by a highly reflective surface 23 and focused on the respective front surface 24 of the lens dispersing at a 30-degree angle in an overlapping relationship to adjacent modified lenses 21.

The sheet array 15 of the molded serpentine lenticular lenses 15 used in the inventive method of this invention are comprised of individual serpentine half cylinder elongated tapered lens shapes, as seen in FIG. 3 of the drawings, of different dimensions formed within the molded synthetic resin sheet array 15.

Figure 7:
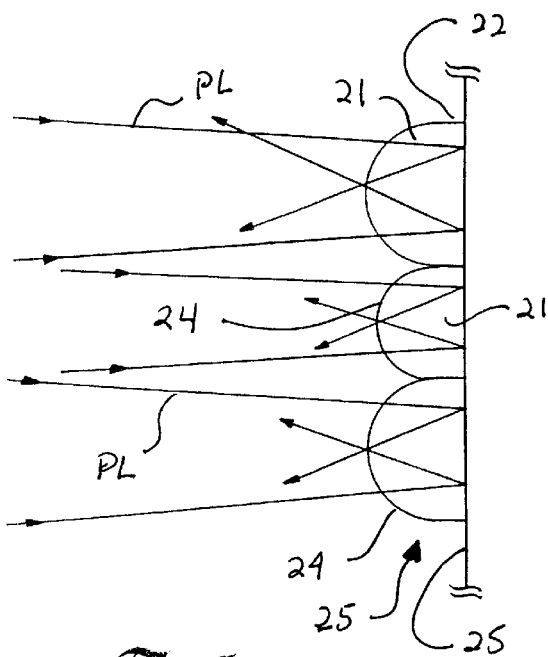
FIG. 7 of the drawings is a graphic illustration of the serpentine lenticular lens array of the invention on a reflective surface.

Referring to FIG. 7 of the drawings, a graphic illustration of sectional lenticular lenses within the array 25 can be seen illustrating the divergents of adjacent lens section performance imparted by the unique serpentine lens shape in actual practice.

Figure 8:
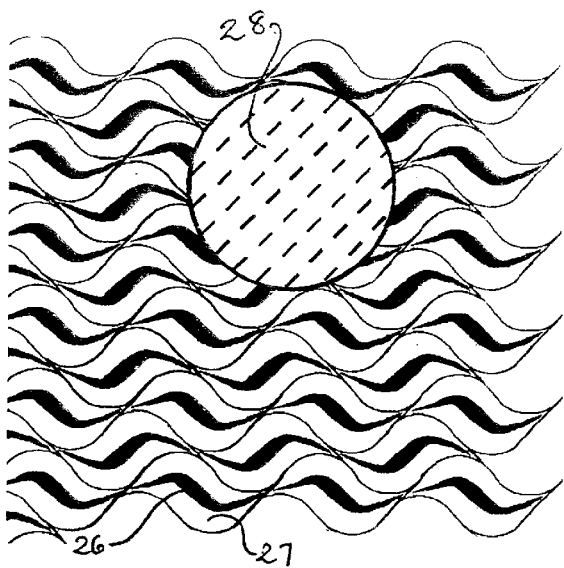
FIG. 8 is an enlarged front elevational view of the serpentine lenticular lens array of the invention.

This unique application of molded serpentine lenticular lenses in a projection environment results in a mosaic of reflective bright spots 26 surrounded by dark regions 27 as illustrated in FIG. 8 of the drawings. Each of the serpentine lenticular lenses 16 of the lens array 15 as described above has dimensional characteristics of less than one-third that of the affective projected light pixel area illustrated at 28 in broken lines on FIG. 8 of the drawings. Accordingly, each of the projected light pixel areas 28 is reflected by at least three of the individual lenticular lenses 16. The human eye (not shown) perceives the multiple bright lines 26 formed on the surface of the sheet lens array 15 closest the viewer as a continuous image of great brightness, thus the human eye perceives the intensity of the bright lines 26 as the overall brightness of the screen 10.

The preferred form of the sheet array 15 of the lenticular lenses 16 is best illustrated in FIGS. 9 & 10 of the drawings in which a true arrangement of lenses 16 is evident is which adjacent lens position will be of different cross-section dimension due to their shaped nature as hereinbefore described.

Referring now to FIG. 11 of the drawings, an alternate form of the invention can be seen in which a screen 29 is curved like a section of a sphere. The curved screen 29 improves ambient light rejection and simplifies the construction of the optics. Curving of the screen enhances the cinerama like effect derived from a large curved screen and the sharpness of the image.

A third embodiment is illustrated in FIG. 12 of the drawings in which a screen 30 is curved like a section on a torus. Curving a screen thus improves ambient light rejection and also simplifies the construction of optics. The inherent double curving of a screen enhances the cinerama effect derives from large curved screens and sharpness of the image.

It will be apparent to those skilled in the art that various changes and modifications may be made therein without departing from the spirit of the invention.

We claim:

1. A front projection screen for pictorially displaying upon a front surface of the screen an image projected onto the screen from a projector comprising, a backing member having a front reflective surface, a sheet of half cylinder lenticular lenses having a front diffusion surface overlaying the reflective surface, said lenticular lenses having oppositely disposed tapered ends.

2. The projection screen set forth in claim 1 wherein each of said lenticular lenses has a hyperbolic cross-sectional configuration.

3. The projection screen set forth in claim 1 wherein said screen is substantially flat.

4. The projection screen set forth in claim 1 wherein said lenticular lenses have a focal length twice their known thickness of said sheet of lenticular lenses.

5. The projection screen set forth in claim 1 wherein said lenticular lenses are tapered on their longitudinal axis defining a serpentine form.

6. The projection screen set forth in claim 1 wherein said lenticular lenses are arranged in abutting relation to one another defining a plurality of contoured contiguous bright spots on the their respective surfaces.

7. The projection screen of claim 1 wherein each of said lenticular lenses are one-half to one-tenth the size of the light image projected on them.

8. The projection screen set forth in claim 1 wherein said backing member is thin and flexible.

9. The projection screen set forth in claim 1 wherein said screen is formed as a spherical segment.

10. The projection screen set forth in claim 1 wherein said screen is formed as a portion of a toroidal segment.

* * * * *